United States Patent
Yanagida (10) Patent No.: US 9,331,573 B2
(45) Date of Patent: May 3, 2016

(54) CIRCUIT AND METHOD FOR CONTROLLING A SWITCHING TRANSISTOR OF A SWITCHING REGULATOR

(75) Inventor: Osamu Yanagida, Kyoto (JP)

(73) Assignee: ROHM CO., LTD. (JP)

( * ) Notice: Subject to any disclaimer, the term of this patent is extended or adjusted under 35 U.S.C. 154(b) by 393 days.

(21) Appl. No.: 13/570,652

(22) Filed: Aug. 9, 2012

(65) Prior Publication Data

US 2013/0038300 A1 Feb. 14, 2013

(30) Foreign Application Priority Data

Aug. 11, 2011 (JP) ................................. 2011-176413

(51) Int. Cl.
*H02M 3/156* (2006.01)
*H02M 3/158* (2006.01)

(52) U.S. Cl.
CPC ............ *H02M 3/1563* (2013.01); *H02M 3/156* (2013.01); *H02M 3/158* (2013.01)

(58) Field of Classification Search
CPC .............. H02M 3/1563; H02M 3/156; H02M 2001/0025; H02M 3/33507; H02M 3/33515; H02M 3/158; G05F 1/10; G05F 1/46
USPC .......... 323/222–224, 271, 282, 284–286, 351
See application file for complete search history.

(56) References Cited

U.S. PATENT DOCUMENTS

| | | | | |
|---|---|---|---|---|
| 6,348,780 B1 * | 2/2002 | Grant | .................... | H02M 3/156 323/222 |
| 2007/0210777 A1 * | 9/2007 | Cervera | ................ | H02M 3/157 323/284 |
| 2008/0143570 A1 * | 6/2008 | Andersson et al. | ........... | 341/144 |
| 2009/0140711 A1 * | 6/2009 | Philbrick | .............. | H02M 3/158 323/285 |
| 2010/0039079 A1 * | 2/2010 | Hartlieb et al. | ................ | 323/234 |
| 2010/0156366 A1 * | 6/2010 | Sakai et al. | ..................... | 323/282 |
| 2010/0301827 A1 * | 12/2010 | Chen et al. | ..................... | 323/299 |
| 2012/0112721 A1 * | 5/2012 | Wu | ........................ | H02M 3/156 323/288 |
| 2012/0139519 A1 * | 6/2012 | Dearborn | ...................... | 323/290 |

FOREIGN PATENT DOCUMENTS

JP        2005-304295 A        10/2005

* cited by examiner

*Primary Examiner* — Fred E Finch, III
*Assistant Examiner* — Gustavo Rosario Benitez
(74) *Attorney, Agent, or Firm* — Cantor Colburn LLP (57) ABSTRACT

A control circuit for controlling a switching transistor of a switching regulator includes a hysteresis comparator circuit comparing a feedback voltage according to an output signal of the switching regulator with a reference voltage and a threshold voltage and outputting a pulse width modulation signal as an output signal of the hysteresis comparator circuit, where the threshold voltage has a hysteresis according to the pulse width modulation signal. The control circuit further includes a driver driving the switching transistor based on the pulse width modulation signal, a phase comparator generating a phase difference signal based on a phase difference between a reference clock signal and a pulse signal corresponding to the pulse width modulation signal, and a loop filter generating a control voltage by filtering the phase difference signal. The hysteresis comparator circuit is further configured to control a response speed thereof depending on the control voltage.

11 Claims, 6 Drawing Sheets

CIRCUIT AND METHOD FOR CONTROLLING A SWITCHING TRANSISTOR OF A SWITCHING REGULATOR

CROSS-REFERENCE TO RELATED APPLICATION

This application is based upon and claims the benefit of priority from Japanese Patent Application No. 2011-176413, filed on Aug. 11, 2011, the entire contents of which are incorporated herein by reference.

TECHNICAL FIELD

The present disclosure relates to a switching regulator.

BACKGROUND

Recently, a device requiring a power source voltage, which may be higher or lower than a battery voltage as needed, is mounted to an electronic apparatus such as a cellular phone or a PDA (Personal Digital Assistants). In order to supply a suitable power source voltage to such device, a step-up, a step-down or a step-up-down switching regulator may be employed.

Hysteresis control is known as a switching regulator control method. The hysteresis control has superior load-responsiveness compared to a voltage-mode or a current-mode control method using an error amplifier. In a switching regulator for hysteresis control, the switching frequency fluctuates depending on the load current or the input voltage.

The switching regulator emits an electromagnetic wave according to the switching operation thereof. For this reason, a countermeasure against EMI (Electromagnetic Interference) is required in an electronic apparatus equipped with the switching regulator. However, since the switching frequency fluctuates in case of using the switching regulator for hysteresis control, a problem arises in that it is difficult to establish a countermeasure against EMI.

SUMMARY

The present disclosure provides some embodiments of a hysteresis control switching regulator having a stable switching frequency.

In accordance with an aspect of the present disclosure, there is provided a control circuit for controlling a switching transistor of a switching regulator. A control circuit for controlling a switching transistor of a switching regulator includes a hysteresis comparator circuit configured to compare a feedback voltage according to an output signal of the switching regulator with a reference voltage and a threshold voltage and output a pulse width modulation signal as an output signal of the hysteresis comparator circuit, where the threshold voltage has a hysteresis according to the pulse width modulation signal. The control circuit further includes a driver configured to drive the switching transistor based on the pulse width modulation signal, a phase comparator configured to generate a phase difference signal based on a phase difference between a reference clock signal and a pulse signal corresponding to the pulse width modulation signal. Additionally, a loop filter configured to generate a control voltage by filtering the phase difference signal is included in the control circuit. In this control circuit, the hysteresis comparator circuit is configured so that a response speed thereof is variably controlled depending on the control voltage.

The frequency of the pulse width modulation signal output from the hysteresis comparator circuit can be changed by changing the response speed of the hysteresis comparator circuit. With the above-described aspect, feedback control is performed so that the frequency of the pulse width modulation signal is equal to the frequency of the reference clock signal. Accordingly, the long-term fluctuation of the switching frequency of the switching transistor can be suppressed.

The hysteresis comparator circuit may include: a comparator having a first input terminal to which the feedback voltage is input and a second input terminal to which the reference voltage is input; and one of a first feedback circuit and a second feedback circuit. The first feedback circuit may be configured to feed a first feedback pulse signal back to the second input terminal of the comparator, the first feedback pulse signal having a logic level opposite to a logic level of the pulse width modulation signal. The second feedback circuit may be configured to feed a second feedback pulse signal back to the first input terminal, the second feedback pulse signal having the same logic level as the logic level of the pulse width modulation signal.

In some embodiments, the bias current of the comparator may be variably controlled depending on the control voltage. By changing the bias current of the comparator, the response speed of the comparator can be controlled. As a result, the response speed of the hysteresis comparator circuit can be controlled.

In some embodiments, the time constant of each of the first and the second feedback circuit may be variably controlled depending on the control voltage. By changing the time constant, i.e., propagation delay, of the feedback circuit, the transition speed of the threshold voltage can be controlled. As a result, the response speed of the hysteresis comparator circuit can be controlled.

In some embodiments, each of the first and the second feedback circuit may include a resistor and a capacitor which are serially connected to each other, the resistor having a resistance variably controlled depending on the control voltage.

In some embodiments, each of the first and the second feedback circuit may include a resistor and a capacitor which are serially connected to each other, the capacitor having a capacitance variably controlled depending on the control voltage.

In some embodiments, each of the first and the second feedback circuit may include a resistor, a capacitor and a delay circuit which are serially connected to one another, the delay circuit having a delay amount variably controlled depending on the control voltage.

In some embodiments, each of the first and the second feedback circuit may include an inverter configured to invert the pulse width modulation signal, a resistor and a capacitor which are serially connected to one another, the inverter having a delay amount variably controlled depending on the control voltage.

In accordance with another aspect of the present disclosure, there is provided a power supply device including the control circuit set forth above.

In accordance with still another aspect of the present disclosure, there is provided an electronic apparatus including the power supply device.

Alternative embodiments of the present disclosure may include any combinations of the components described above and substitutions of the components and expressions of the present disclosure between a method, an apparatus and a system.

According to the above embodiments of the present disclosure, the frequency of the switching regulator for hysteresis control can be stabilized.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Embodiments of the present disclosure will now be described in detail with reference to the drawings. Identical or similar components, members and treatments shown in the respective drawings will be designated by like reference symbols with no repeated description made thereon. The embodiments disclosed herein is not intended to limit the present disclosure but is presented for illustrative purposes. All the features and combinations described in respect of the embodiments are not necessarily essential to the present disclosure.

In the following description, the expression "a member A being connected to a member B" includes not only a case where the members A and B are physically and directly connected to each other, but also a case where the members A and B are indirectly connected to each other through another member, which does not substantially affect the electrical connection between the members A and B and does not impair the functions and effects offered by the connection between the members A and B. Similarly, the expression "a member C being provided between a member A and a member B" includes a case where the members A and C or the members B and C are directly connected to each other but also a case where the members A and C or the members B and C are indirectly connected to each other through another member, which does not substantially affect the electrical connection between the members A and B and does not impair the functions and effects offered by the connection between the members A and B.

Figure 1:
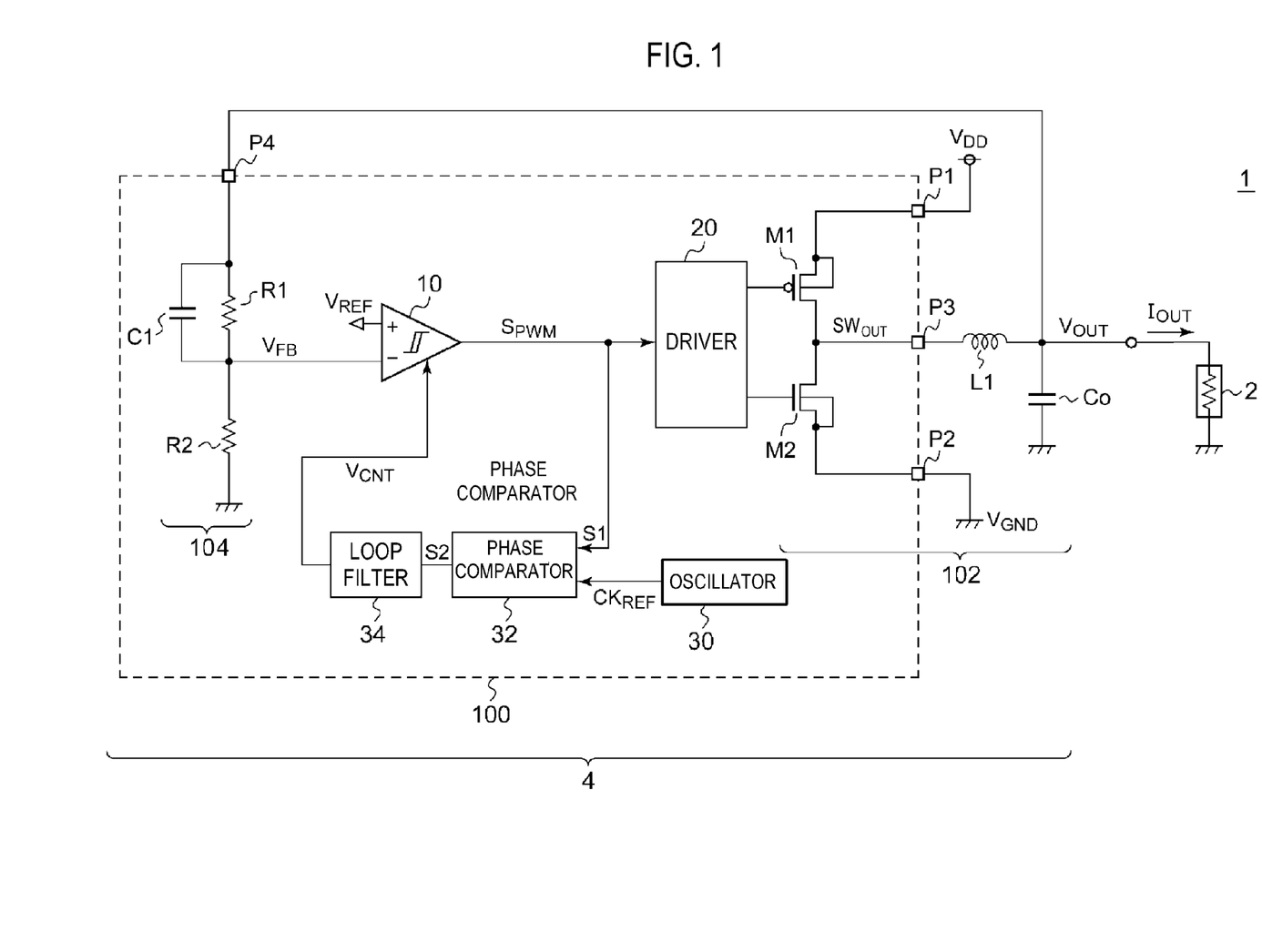
FIG. 1 is a circuit diagram illustrating the configuration of an electronic apparatus provided with a switching regulator according to an embodiment of the present disclosure.

FIG. 1 is a circuit diagram illustrating the configuration of an electronic apparatus provided with a switching regulator (power supply device) 4 according to an embodiment of the present disclosure.

The switching regulator 4 is mounted to an electronic apparatus, e.g., a cellular phone, a digital camera, a digital video camera or a portable audio player, together with a load 2, e.g., a DSP (Digital Signal Processor), a liquid crystal driver or an audio circuit. The switching regulator 4 is supplied with a power source voltage (input voltage) $V_{DD}$ and generates a stabilized output voltage $V_{OUT}$ by lowering the power source voltage $V_{DD}$. The switching regulator 4 supplies the output voltage $V_{OUT}$ to the load 2 to flow a load current $I_{OUT}$ to the load 2. The power source voltage $V_{DD}$ is supplied from a battery or an external power source.

The switching regulator 4 includes a control circuit 100, an inductor L1 and an output capacitor Co. Though a switching transistor M1 and a synchronous rectification transistor M2 are arranged inside the control circuit 100 in FIG. 1, they may be discrete elements arranged outside the control circuit 100.

The topology of an output circuit 102 including the switching transistor M1, the synchronous rectification transistor M2, the inductor L1 and the output capacitor Co is the same as the topology of a typical synchronous-rectification switching regulator.

The control circuit 100 drives the switching transistor M1 and the synchronous rectification transistor M2 based on a feedback voltage $V_{FB}$ according to an output signal (the output voltage $V_{OUT}$ in the present embodiment) of the switching regulator 4, thereby stabilizing the output voltage $V_{OUT}$ to a desired level.

The control circuit 100 includes a power supply terminal P1, a ground terminal P2, a switching terminal P3 and a feedback terminal P4. A power source voltage $V_{DD}$ is input to the power supply terminal P1. A ground voltage $V_{GND}$ is supplied to the ground terminal P2. The switching terminal P3 is a terminal through which an electric potential (switching signal) $SW_{OUT}$ at the connection point between the switching transistor M1 and the synchronous rectification transistor M2 is output to the inductor L1. The output voltage $V_{OUT}$ is fed back to the feedback terminal P4. The feedback terminal P4 is grounded through a circuit 104 including a first capacitor C1 and a first and a second resistor R1 and R2. The first resistor R1 is connected to the feedback terminal P4. One end of the second resistor R2 is serially connected to the first resistor R1 and the other end of the second resistor R2 is grounded. Further, the first capacitor C1 is connected in parallel with the first resistor R1. The feedback voltage $V_{FB}$ is a node voltage between the first and the second resistor R1 and R2.

In addition to the switching transistor M1 and the synchronous rectification transistor M2, the control circuit 100 further includes a hysteresis comparator 10, a driver 20, an oscillator 30, a phase comparator 32 and a loop filter 34.

The hysteresis comparator 10 compares the feedback voltage $V_{FB}$ according to the output voltage $V_{OUT}$ of the switching regulator 4 with a threshold voltage $V_{TH}$ having a hysteresis. The threshold voltage $V_{TH}$ has a hysteresis according to a reference voltage $V_{REF}$ and an output signal (pulse width modulation signal) $S_{PWM}$ of the hysteresis comparator 10. More specifically, the threshold voltage $V_{TH}$ makes a transition between two levels, namely an upper threshold voltage $V_H$ and a lower threshold voltage $V_L$. If the feedback voltage $V_{FB}$ is lower than the threshold voltage $V_{TH}$, the threshold voltage $V_{TH}$ is set to the upper threshold voltage $V_H$. If the feedback voltage $V_{FB}$ is higher than the threshold voltage $V_{TH}$, the threshold voltage $V_{TH}$ is set to the lower threshold voltage $V_L$.

The driver 20 complementarily drives the switching transistor M1 and the synchronous rectification transistor M2 based on the pulse width modulation signal $S_{PWM}$ output from the hysteresis comparator 10. More specifically, if the feedback voltage $V_{FB}$ is lower than the threshold voltage $V_{TH}$, the pulse width modulation signal $S_{PWM}$ is set to a first level (low level). If the feedback voltage $V_{FB}$ is higher than the threshold voltage $V_{TH}$, the pulse width modulation signal $S_{PWM}$ is set to a second level (high level). During the time period when the pulse width modulation signal $S_{PWM}$ is kept to be at the first level (low level), the driver 20 turns on the switching transistor M1 and turns off the synchronous rectification transistor M2. During the time period when the pulse width modulation signal $S_{PWM}$ is kept to be at the second level (high level), the driver 20 turns off the switching transistor M1 and turns on the synchronous rectification transistor M2.

With the configuration described above, a feedback control is performed so that the feedback voltage $V_{FB}$ gets closer to the reference voltage $V_{REF}$, and thus the output voltage $V_{OUT}$ is stabilized.

The oscillator 30 generates a reference clock signal $CK_{REF}$ having a reference frequency $f_{REF}$. The reference clock signal $CK_{REF}$ may be supplied from the outside of the control circuit 100.

The phase comparator 32 generates a phase difference signal S2 indicating the phase difference between the reference clock signal $CK_{REF}$ and a pulse signal S1 corresponding to the pulse width modulation signal $S_{PWM}$.

In FIG. 1, the pulse width modulation signal $S_{PWM}$ is used as the pulse signal S1 input to the phase comparator 32. However, the pulse signal S1 only needs to have a frequency proportional to that of the pulse width modulation signal $S_{PWM}$. More specifically, the pulse signal S1 may be, e.g., a signal obtained by performing a frequency-division or a frequency-multiplication on the pulse width modulation signal $S_{PWM}$. Alternatively, a gate signal of the switching transistor M1, a gate signal of the synchronous rectification transistor M2 or the switching signal $SW_{OUT}$ of the switching terminal P3 may be used as the pulse signal S1. Further, a signal obtained by performing the frequency-division or the frequency-multiplication on the gate signal of the switching transistor M1, the gate signal of the synchronous rectification transistor M2 or the switching signal $SW_{OUT}$ of the switching terminal P3 may be used as the pulse signal S1.

The loop filter 34 filters the phase difference signal S2 output from the phase comparator 32 to generate a control voltage $V_{CNT}$. The configurations of the phase comparator 32 and the loop filter 34 are not limited hereto. A well-known PLL (Phase Locked Loop) circuit or the like may be used as the phase comparator 32 and the loop filter 34.

The hysteresis comparator 10 is configured so that the response speed thereof can be controlled depending on the control voltage $V_{CNT}$. More specifically, the response speed of the hysteresis comparator 10 can be controlled to get faster as the phase of the pulse signal S1 lags behind the phase of the reference clock signal $CK_{REF}$ and get slower as the phase of the pulse signal S1 leads the phase of the reference clock signal $CK_{REF}$.

In this regard, the level of the phase difference signal S2 increases as the phase of the pulse signal S1 lags behind the phase of the reference clock signal $CK_{REF}$, and decreases as the phase of the pulse signal Si leads the phase of the reference clock signal $CK_{REF}$. In other words, the level of the control voltage $V_{CNT}$ increases as the phase of the pulse signal S1 lags behind the phase of the reference clock signal $CK_{REF}$, and decreases as the phase of the pulse signal S1 leads the phase of the reference clock signal $CK_{REF}$. In that case, the response speed of the hysteresis comparator 10 can be controlled to get faster as the control voltage $V_{CNT}$ increases and get slower as the control voltage $V_{CNT}$ decreases.

Figure 2A:
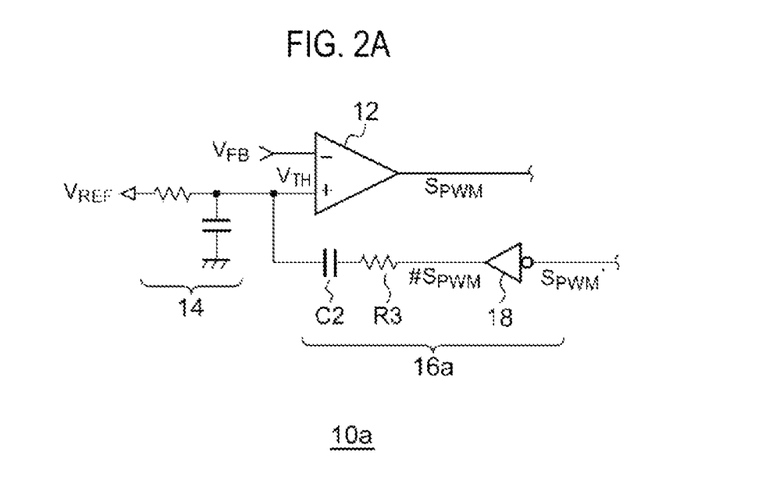
FIGS. 2A and 2B are circuit diagrams illustrating configuration examples of a hysteresis comparator shown in FIG. 1.
Figure 2B:
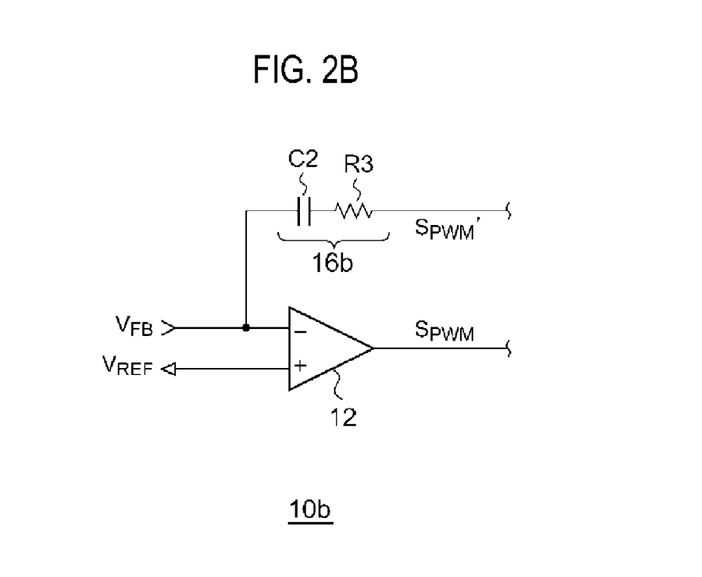

FIGS. 2A and 2B are circuit diagrams illustrating configuration examples of the hysteresis comparator 10 shown in FIG. 1. A hysteresis comparator 10a shown in FIG. 2A includes a comparator 12, a filter 14 and a feedback circuit 16a. The feedback voltage $V_{FB}$ is input to a first input terminal (inverting input terminal) of the comparator 12. The reference voltage $V_{REF}$ is input to a second input terminal (non-inverting input terminal) of the comparator 12 through the filter 14.

The feedback circuit 16a feeds back a feedback pulse signal #$S_{PWM}$, which has a logic level opposite to the logic level of the pulse width modulation signal $S_{PWM}$, to the second input terminal (non-inverting input terminal) of the comparator 12. Hereinafter, the symbol # denotes logic inversion. The threshold voltage $V_{TH}$ has a hysteresis according to a reference voltage $V_{REF}$ and an output signal (pulse width modulation signal) $S_{PWM}$.

The feedback circuit 16a includes a second capacitor C2, a third resistor R3 and an inverter 18, which are serially connected to one another. The inverter 18 receives and inverts a pulse signal $S_{PWM}{}'$ having the same logic level as the pulse width modulation signal $S_{PWM}$ output from the comparator 12. The pulse signal #$S_{PWM}$ output from the inverter 18 is fed back to the second input terminal of the comparator 12 through the third resistor R3 and the second capacitor C2.

A hysteresis comparator 10b shown in FIG. 2B includes the comparator 12 and a feedback circuit 16b.

The feedback voltage $V_{FB}$ is input to a first input terminal (inverting input terminal) of the comparator 12. The reference voltage $V_{REF}$ is input to a second input terminal (non-inverting input terminal) of the comparator 12. The feedback circuit 16b feeds back a feedback pulse signal $S_{PWM}{}'$, which has the same logic level as the logic level of the pulse width modulation signal $S_{PWM}$, to the first input terminal (inverting input terminal) of the comparator 12.

The feedback circuit 16b includes the second capacitor C2 and the third resistor R3, which are serially connected to each other. The feedback pulse signal $S_{PWM}{}'$ is inputted to the first input terminal (inverting input terminal) of the comparator 12 through the second capacitor C2 and the third resistor R3.

Next, description will be made on a method and configuration for changing the response speed of the hysteresis comparator 10.

(First Method)

Figure 3:
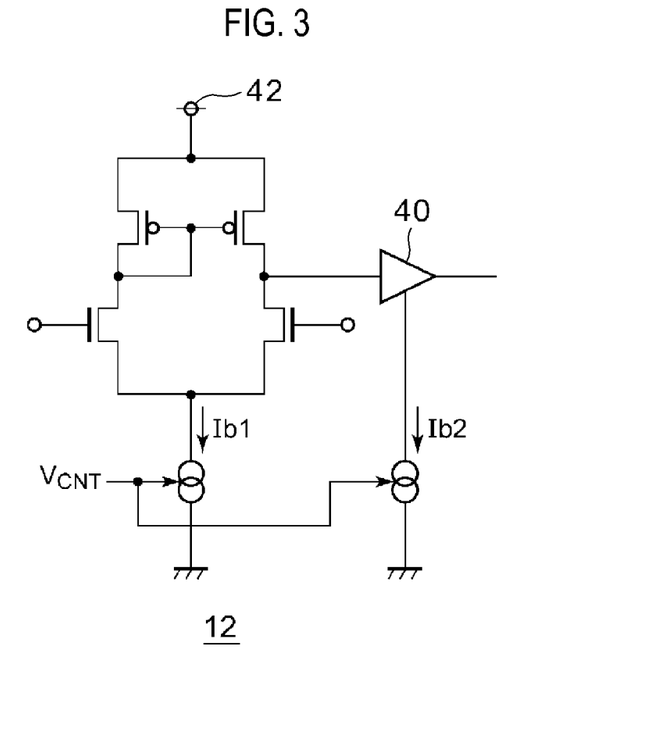
FIG. 3 is a circuit diagram illustrating a configuration example of a comparator shown in FIGS. 2A and 2B.

In a first method, the bias current (drive current) of the comparator 12 forming the hysteresis comparator 10 is controlled depending on the control voltage $V_{CNT}$. FIG. 3 is a circuit diagram illustrating a configuration example of the comparator 12 shown in FIGS. 2A and 2B. For example, the comparator 12 includes a differential amplifier 40 and an output stage 42. At least one of the bias currents Ib1 and Ib2 with respect to the differential amplifier 40 and the output stage 42 is variably controlled depending on the control voltage $V_{CNT}$. The bias current Ib1 is also referred to as a tail current.

If the control voltage $V_{CNT}$ increases, the bias currents IB1 and IB2 increases and the response speed of the comparator 12 gets faster. As a result, the response speed of the hysteresis comparator 10 also gets faster. On the contrary, if the control voltage $V_{CNT}$ decreases, the bias currents IB1 and IB2 decreases and the response speed of the comparator 12 gets slower. As a result, the response speed of the hysteresis comparator 10 also gets slower. The configuration of the comparator 12 is not limited to the one shown in FIG. 3, and many different circuits well-known in the art may be used as the comparator 12.

(Second Method)

In a second method, the time constant of the feedback circuit 16 of the hysteresis comparator 10 is variably controlled depending on the control voltage $V_{CNT}$.

FIGS. 4A to 4D are circuit diagrams illustrating configuration examples of the hysteresis comparator 10a shown in FIG. 2A in which the time constant of the feedback circuit 16a is variably controlled.

Figure 4A:
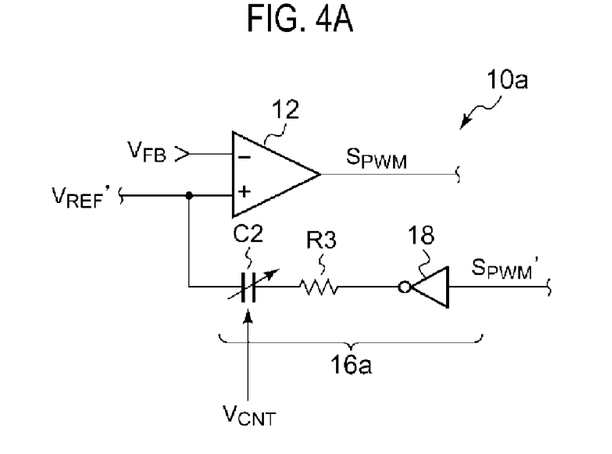
FIGS. 4A to 4D are circuit diagrams illustrating configuration examples of a hysteresis comparator shown in FIG. 2A in which the time constant of a feedback circuit is variable.

In FIG. 4A, the second capacitor C2 is formed of a variable capacitor. The capacitance of the second capacitor C2 is variably controlled depending on the control voltage $V_{CNT}$. Many different circuits well-known in the art, including a switching capacitor and a variable capacitance diode (varactor), may be used as the variable capacitor whose capacitance can be controlled depending on an analog voltage. The configuration of the variable capacitor is not limited hereto. The time constant of the feedback circuit 16a increases as the capacitance of the second capacitor C2 increases. Thus, the response speed of the hysteresis comparator 10a gets slower.

Figure 4B:
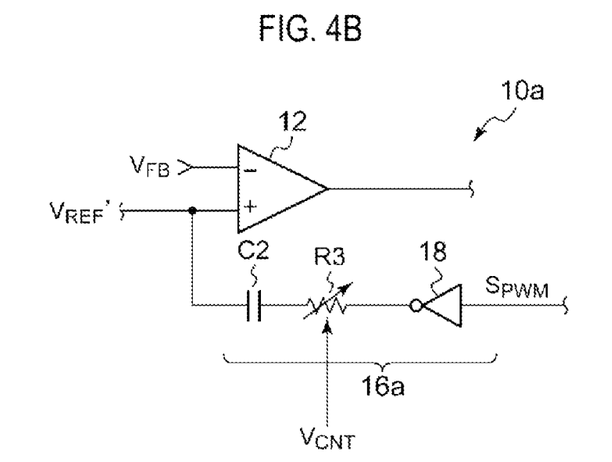

In FIG. 4B, the third resistor R3 is formed of a variable resistor. The resistance of the third resistor R3 is variably controlled depending on the control voltage $V_{CNT}$. A resistor using the on-resistance of a MOSFET or a bipolar transistor or using a varistor may be used as the variable resistor whose resistance value can be controlled depending on an analog voltage. The time constant of the feedback circuit 16a increases as the resistance of the third resistor R3 increases. Thus, the response speed of the hysteresis comparator 10a gets slower.

Figure 4C:
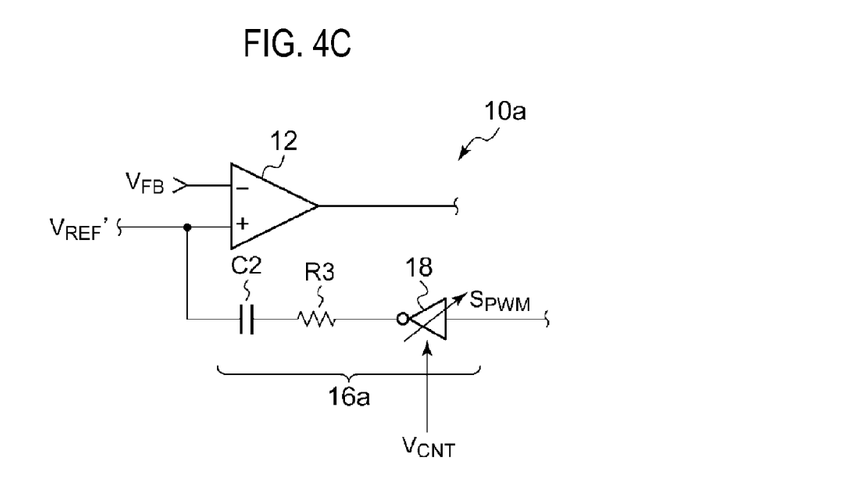

In FIG. 4C, the response speed (delay time) of the inverter 18 on the route of the feedback circuit 16a is variably controlled depending on the control voltage $V_{CNT}$. The delay amount can be controlled by controlling the power source voltage or the bias current of the inverter 18 depending on the control voltage $V_{CNT}$. The time constant of the feedback circuit 16a increases as the delay amount of the inverter 18 increases. Thus, the response speed of the hysteresis comparator 10a gets slower.

Figure 4D:
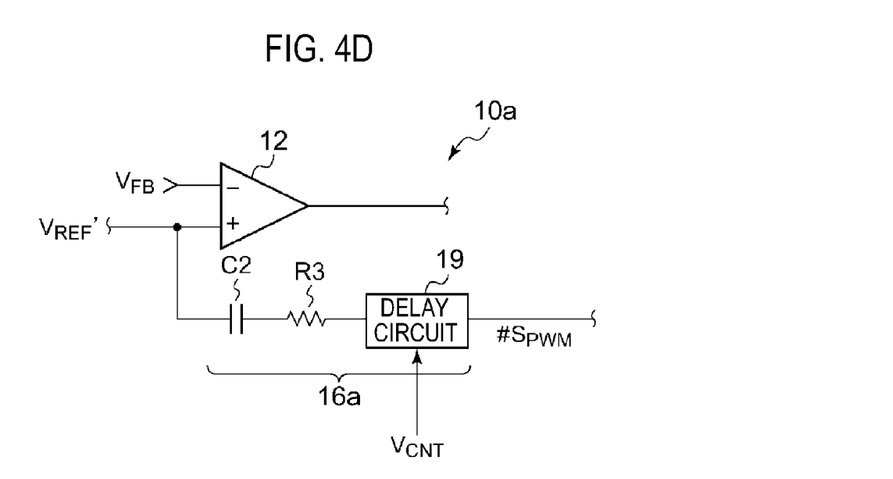

In FIG. 4D, a delay circuit 19 is provided on the route of the feedback circuit 16a. The delay amount given to the feedback pulse signal #$S_{PWM}$ by the delay circuit 19 is variably controlled depending on the control voltage $V_{CNT}$. The delay circuit 19 may be a circuit well-known in the art. The configuration of the delay circuit 19 is not limited hereto. The inverter 18 shown in FIG. 4C can be regarded as one form of the delay circuit 19. The time constant of the feedback circuit 16a increases as the delay amount of the delay circuit 19 increases. Thus, the response speed of the hysteresis comparator 10a gets slower.

While FIGS. 4A to 4D illustrate the configurations based on the hysteresis comparator 10a shown in FIG. 2A, the same variations as described above can be applied to the hysteresis comparator 10b shown in FIG. 2B. These variations are also included in the scope of the present disclosure.

The foregoing description is directed to the configuration of the switching regulator 4 according to the present embodiment. Next, the operation of the switching regulator 4 will be described.

Figure 5:
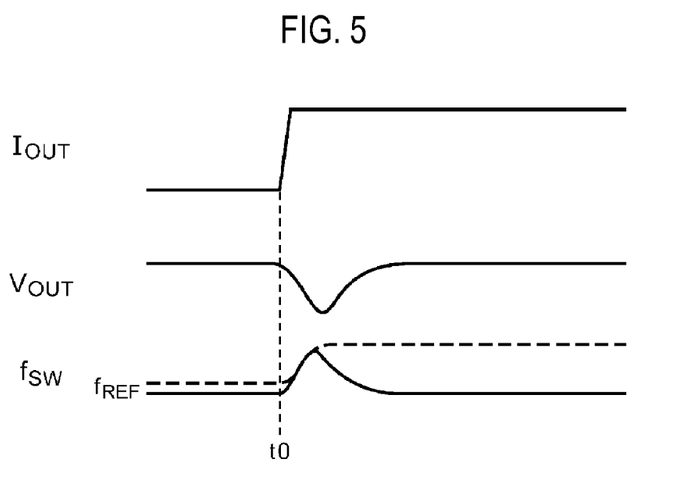
FIG. 5 is a waveform diagram illustrating the operation of the switching regulator shown in FIG. 1.

FIG. 5 is a waveform diagram illustrating the operation of the switching regulator 4 shown in FIG. 1. The load current (output current) $I_{OUT}$, the output voltage $V_{OUT}$ and a switching frequency $f_{SW}$ are shown in FIG. 5 in the named order from the top. In FIG. 5, the vertical axis and the horizontal axis of the waveform diagram or the time chart are appropriately enlarged or reduced for easier understanding. The respective waveforms are also simplified for easier understanding.

The advantages of the switching regulator 4 according to the present embodiment will become apparent from the comparison with a comparative art in which the response speed control of the hysteresis comparator 10 depending on the control voltage $V_{CNT}$ is not performed. First, the operation when the response speed of the hysteresis comparator 10 is fixed will be described. In FIG. 5, the switching frequency $f_{SW}$ of the comparative art is indicated by a broken line and the switching frequency $f_{SW}$ of the present embodiment is indicated by a solid line.

Prior to time t0, the switching regulator 4 is kept in a normal state. The output voltage $V_{OUT}$ is stabilized at a target level. The frequency (switching frequency) $f_{SW}$ of the pulse width modulation signal $S_{PWM}$ is also maintained at a constant level.

At time t0, the load current $I_{OUT}$ of the switching regulator 4 is rapidly increased. In response, the response speed of the hysteresis comparator 10 gets a little slower. Therefore, the output voltage $V_{OUT}$ decreases. In order to increase the decreasing output voltage $V_{OUT}$, the switching frequency $f_{SW}$ of the pulse width modulation signal $S_{PWM}$ increases and the output voltage $V_{OUT}$ is increased to the target level.

After the output voltage $V_{OUT}$ is stabilized, the switching frequency $f_{SW}$ indicated by a broken line is stabilized at a level different from the level available before time t0. That is to say, in the comparative art, the switching frequency $f_{SW}$ is changed each time when there occurs a change in load or input voltage.

Next, the operation of the switching regulator 4 will be described according to the present embodiment. The operation prior to time t0 is the same as the operation of the comparative art. In the switching regulator 4 according to the present embodiment, prior to time t0, the switching frequency $f_{SW}$ is stabilized at the reference frequency $f_{REF}$ equal to the frequency of the reference clock signal $CK_{REF}$.

At time t0, if the load current $I_{OUT}$ is increases, the output voltage $V_{OUT}$ decreases. In the switching regulator 4, the switching frequency $f_{SW}$ is first increased in order to restore the output voltage $V_{OUT}$ to the original level. This operation is the same as the operation of the comparative art. Then, in the switching regulator 4, a feedback control is performed by the loop including the phase comparator 32, the loop filter 34 and the hysteresis comparator 10 so that the switching frequency $f_{SW}$ decreases to be equal to the reference frequency $f_{REF}$. However, a delay occurs in the feedback control of the frequency due to the time constant of the loop filter 34. Therefore, a frequency change is permitted in the time zone shorter than the time constant of the loop filter 34, whereby the frequency change can follow the load change or the input voltage change. In other words, even if the feedback control of the switching frequency $f_{SW}$ is performed, the advantage of the hysteresis control, namely the fast load responsiveness, is not impaired.

After the switching frequency $f_{SW}$ increases, the level of the control voltage $V_{CNT}$ is changed pursuant to the time constant of the loop filter 34 by the loop including the phase comparator 32, the loop filter 34 and the hysteresis comparator 10 so that the output voltage $V_{OUT}$ can be restored to the original level. After all, the switching frequency $f_{SW}$ converges to the reference frequency $f_{REF}$.

As described above, with the switching regulator 4 according to the present embodiment, frequency fluctuation can be suppressed and the switching frequency can be kept constant in a long term while permitting short-term frequency fluctuation and maintaining enhanced load responsiveness.

Since the switching frequency $f_{SW}$ is kept constant in the switching regulator 4, it becomes easy to take a countermeasure against EMI as compared with the comparative art.

It is often the case that multiple channels of switching regulators are mounted to a single electronic apparatus. The switching regulators are operated by a power source voltage $V_{DD}$ received from a common power source. If the switching regulators according to the comparative art are used under this circumstance, since the switching frequencies of the respective switching regulators are changed independently, different types of frequency noises overlap with the power source voltage $V_{DD}$. This may adversely affect other ICs (Integrated Circuits) operated by the same power source voltage $V_{DD}$.

Further, if the multiple channels of switching regulators are asynchronously operated, a problem occurs in that the output current of the common power source becomes very high at a certain moment.

This problem can be solved by installing a multiple channels of the switching regulators 4 of the present embodiment and operating the switching regulators 4 in synchronism with the common reference clock signal $CK_{REF}$.

Though the embodiment of the present disclosure has been described above, the embodiment is presented by way of example only. It will be apparent to those skilled in the art that the combinations of the respective components and the respective treatment processes may be modified in many different forms and these modifications should be construed to fall within the scope of the present disclosure. Description will now be made on the modifications.

While the synchronous-rectification step-down switching regulator has been described in the foregoing embodiment, the present disclosure may be applied to a diode-rectification step-down switching regulator. Moreover, the present disclosure may be applied to a step-up or a step-up-down switching regulator. Such modifications can be realized by changing the topology of the output circuit 102.

While certain embodiment has been described, this embodiment has been presented by way of example only, and is not intended to limit the scope of the disclosures. Indeed, the novel methods and apparatuses described herein may be embodied in a variety of other forms; furthermore, various omissions, substitutions and changes in the form of the embodiment described herein may be made without departing from the spirit of the disclosures. The accompanying claims and their equivalents are intended to cover such forms or modifications as would fall within the scope and spirit of the disclosures.

What is claimed is:

1. A control circuit for controlling a switching transistor of a switching regulator, comprising:
   a hysteresis comparator circuit configured to compare a feedback voltage according to an output signal of the switching regulator with a threshold voltage, and configured to output a pulse width modulation signal as an output signal of the hysteresis comparator circuit, the threshold voltage having a hysteresis according to the pulse width modulation signal, and a response speed of the hysteresis comparator circuit being controllable;
   a driver, to which the pulse width modulation signal is input, configured to drive the switching transistor based on the pulse width modulation signal;
   a phase comparator configured to generate a phase difference signal based on a phase difference between a reference clock signal and a pulse signal corresponding to the pulse width modulation signal; and
   a loop filter configured to generate a control voltage by filtering the phase difference signal,
   wherein the hysteresis comparator circuit is further configured to control the response speed thereof depending on the control voltage so that the response speed of the hysteresis comparator increases as the phase of the pulse signal lags behind the phase of the reference clock signal, and decreases as the phase of the pulse signal leads the phase of the reference clock signal,
   wherein the hysteresis comparator circuit includes:
   a comparator including a first input terminal to which the feedback voltage is input and a second input terminal to which the reference voltage is input; and
   one of a first feedback circuit and a second feedback circuit,
   wherein the first feedback circuit is configured to feed a first feedback pulse signal back to the second input terminal, and the first feedback pulse signal has a logic level opposite to a logic level of the pulse width modulation signal,
   wherein the second feedback circuit is configured to feed a second feedback pulse signal back to the first input terminal, and the second feedback pulse signal has the same logic level as the logic level of the pulse width modulation signal,
   wherein each of the first and the second feedback circuits variably controls a time constant depending on the control voltage, and
   wherein each of the first and the second feedback circuits includes a resistor and a capacitor which are serially connected to each other, and the resistor variably controls a resistance depending on the control voltage.

2. A control circuit for controlling a switching transistor of a switching regulator, comprising:
   a hysteresis comparator circuit configured to compare a feedback voltage according to an output signal of the switching regulator with a threshold voltage, and configured to output a pulse width modulation signal as an output signal of the hysteresis comparator circuit, the threshold voltage having a hysteresis according to the pulse width modulation signal, and a response speed of the hysteresis comparator circuit being controllable;
   a driver configured to drive the switching transistor based on the pulse width modulation signal;
   a phase comparator configured to generate a phase difference signal based on a phase difference between a reference clock signal and a pulse signal corresponding to the pulse width modulation signal; and
   a loop filter configured to generate a control voltage by filtering the phase difference signal,
   wherein the hysteresis comparator circuit is further configured to control the response speed thereof depending on the control voltage so that the response speed of the hysteresis comparator increases as the phase of the pulse signal lags behind the phase of the reference clock signal, and decreases as the phase of the pulse signal leads the phase of the reference clock signal, and
   wherein the hysteresis comparator circuit includes:
   a comparator including a first input terminal to which the feedback voltage is input and a second input terminal to which a reference voltage is input; and
   one of a first feedback circuit and a second feedback circuit,
   wherein the first feedback circuit is configured to feed a first feedback pulse signal back to the second input terminal, and the first feedback pulse signal has a logic level opposite to a logic level of the pulse width modulation signal,
   wherein the second feedback circuit is configured to feed a second feedback pulse signal back to the first input terminal, and the second feedback pulse signal has the same logic level as the logic level of the pulse width modulation signal, and
   wherein the comparator variably controls a bias current depending on the control voltage.

3. A control circuit for controlling a switching transistor of a switching regulator, comprising:

a hysteresis comparator circuit configured to compare a feedback voltage according to an output signal of the switching regulator with a threshold voltage, and configured to output a pulse width modulation signal as an output signal of the hysteresis comparator circuit, the threshold voltage having a hysteresis according to the pulse width modulation signal, and a response speed of the hysteresis comparator circuit being controllable;

a driver, to which the pulse width modulation signal is input, configured to drive the switching transistor based on the pulse width modulation signal;

a phase comparator configured to generate a phase difference signal based on a phase difference between a reference clock signal and a pulse signal corresponding to the pulse width modulation signal; and a loop filter configured to generate a control voltage by filtering the phase difference signal, wherein the hysteresis comparator circuit is further configured to control the response speed thereof depending on the control voltage so that the response speed of the hysteresis comparator increases as the phase of the pulse signal lags behind the phase of the reference clock signal, and decreases as the phase of the pulse signal leads the phase of the reference clock signal, wherein the hysteresis comparator circuit includes:

a comparator including a first input terminal to which the feedback voltage is input and a second input terminal to which the reference voltage is input; and one of a first feedback circuit and a second feedback circuit, wherein the first feedback circuit is configured to feed a first feedback pulse signal back to the second input terminal, and the first feedback pulse signal has a logic level opposite to a logic level of the pulse width modulation signal, wherein the second feedback circuit is configured to feed a second feedback pulse signal back to the first input terminal, and the second feedback pulse signal has the same logic level as the logic level of the pulse width modulation signal, wherein each of the first and the second feedback circuits variably controls a time constant depending on the control voltage, and wherein each of the first and the second feedback circuits includes a resistor and a capacitor which are serially connected to each other, and the capacitor variably controls a capacitance depending on the control voltage.

4. A control circuit for controlling a switching transistor of a switching regulator, comprising:

a hysteresis comparator circuit configured to compare a feedback voltage according to an output signal of the switching regulator with a threshold voltage, and configured to output a pulse width modulation signal as an output signal of the hysteresis comparator circuit, the threshold voltage having a hysteresis according to the pulse width modulation signal, and a response speed of the hysteresis comparator circuit being controllable;

a driver, to which the pulse width modulation signal is input, configured to drive the switching transistor based on the pulse width modulation signal;

a phase comparator configured to generate a phase difference signal based on a phase difference between a reference clock signal and a pulse signal corresponding to the pulse width modulation signal; and a loop filter configured to generate a control voltage by filtering the phase difference signal, wherein the hysteresis comparator circuit is further configured to control the response speed thereof depending on the control voltage so that the response speed of the hysteresis comparator increases as the phase of the pulse signal lags behind the phase of the reference clock signal, and decreases as the phase of the pulse signal leads the phase of the reference clock signal, and wherein the hysteresis comparator circuit includes:

a comparator including a first input terminal to which the feedback voltage is input and a second input terminal to which a reference voltage is input; and one of a first feedback circuit and a second feedback circuit, wherein the first feedback circuit is configured to feed a first feedback pulse signal back to the second input terminal, and the first feedback pulse signal has a logic level opposite to a logic level of the pulse width modulation signal, wherein the second feedback circuit is configured to feed a second feedback pulse signal back to the first input terminal, and the second feedback pulse signal has the same logic level as the logic level of the pulse width modulation signal, wherein each of the first and the second feedback circuits variably controls a time constant depending on the control voltage, and wherein each of the first and the second feedback circuits includes a resistor, a capacitor and a delay circuit which are serially connected to one another, the delay circuit variably controlling a delay amount depending on the control voltage.

5. A control circuit for controlling a switching transistor of a switching regulator, comprising:

a hysteresis comparator circuit configured to compare a feedback voltage according to an output signal of the switching regulator with a threshold voltage, and configured to output a pulse width modulation signal as an output signal of the hysteresis comparator circuit, the threshold voltage having a hysteresis according to the pulse width modulation signal, and a response speed of the hysteresis comparator circuit being controllable;

a driver, to which the pulse width modulation signal is input, configured to drive the switching transistor based on the pulse width modulation signal;

a phase comparator configured to generate a phase difference signal based on a phase difference between a reference clock signal and a pulse signal corresponding to the pulse width modulation signal; and a loop filter configured to generate a control voltage by filtering the phase difference signal, wherein the hysteresis comparator circuit is further configured to control the response speed thereof depending on the control voltage so that the response speed of the hysteresis comparator increases as the phase of the pulse signal lags behind the phase of the reference clock signal, and decreases as the phase of the pulse signal leads the phase of the reference clock signal, wherein the hysteresis comparator circuit includes:

a comparator including a first input terminal to which the feedback voltage is input and a second input terminal to which the reference voltage is input; and one of a first feedback circuit and a second feedback circuit, wherein the first feedback circuit is configured to feed a first feedback pulse signal back to the second input terminal, and the first feedback pulse signal has a logic level opposite to a logic level of the pulse width modulation signal, wherein the second feedback circuit is configured to feed a second feedback pulse signal back to the first input terminal, and the second feedback pulse signal has the same logic level as the logic level of the pulse width modulation signal, wherein each of the first and the second feedback circuits variably controls a time constant depending on the control voltage, and wherein each of the first and the second feedback circuits includes an inverter configured to invert the pulse width modulation signal, a resistor and a capacitor which are serially connected to one another, the inverter variably controlling a delay amount depending on the control voltage.

6. A control method for controlling a switching transistor of a switching regulator, comprising:

comparing, by using a hysteresis comparator circuit outputting a pulse width modulation signal as an output signal, where a response speed of the hysteresis comparator circuit is controllable, a feedback voltage according to an output signal of the switching regulator with a threshold voltage having a hysteresis according to the pulse width modulation signal;

driving the switching transistor based on the pulse width modulation signal;

generating a phase difference signal based on a phase difference between a reference clock signal and a pulse signal corresponding to the pulse width modulation signal;

generating a control voltage by filtering the phase difference signal; and feedback-controlling the response speed of the hysteresis comparator circuit depending on the control voltage so that the response speed of the hysteresis comparator increases as the phase of the pulse signal lags behind the phase of the reference clock signal, and decreases as the phase of the pulse signal leads the phase of the reference clock signal, wherein the hysteresis comparator circuit includes:

a comparator including a first input terminal to which the feedback voltage is input and a second input terminal to which the reference voltage is input; and one of a first feedback circuit and a second feedback circuit, wherein the first feedback circuit is configured to feed a first feedback pulse signal back to the second input terminal, and the first feedback pulse signal has a logic level opposite a logic level of the pulse width modulation signal, wherein the second feedback circuit is configured to feed a second feedback pulse signal back to the first input terminal, and the second feedback pulse signal has the same logic level as the logic level of the pulse width modulation signal, and wherein said feedback-controlling the response speed of the hysteresis comparator circuit includes controlling a bias current of the hysteresis comparator circuit depending on the control voltage.

7. A control circuit for controlling a switching transistor of a switching regulator, comprising:

a hysteresis comparator circuit configured to compare a feedback voltage according to an output signal of the switching regulator with a threshold voltage, and configured to output a pulse width modulation signal as an output signal of the hysteresis comparator circuit, the threshold voltage having a hysteresis according to the pulse width modulation signal;

a driver, to which the pulse width modulation signal is input, configured to drive the switching transistor based on the pulse width modulation signal;

a phase comparator configured to generate a phase difference signal based on a phase difference between a reference clock signal and a pulse signal corresponding to the pulse width modulation signal; and a loop filter configured to generate a control voltage by filtering the phase difference signal, wherein the hysteresis comparator circuit is further configured to control a response speed thereof depending on the control voltage, wherein the hysteresis comparator circuit includes:

a comparator including a first input terminal to which the feedback voltage is input and a second input terminal to which a reference voltage is input; and one of a first feedback circuit and a second feedback circuit, wherein the first feedback circuit is configured to feed a first feedback pulse signal back to the second input terminal, and the first feedback pulse signal has a logic level opposite to a logic level of the pulse width modulation signal, wherein the second feedback circuit is configured to feed a second feedback pulse signal back to the first input terminal, and the second feedback pulse signal has the same logic level as the logic level of the pulse width modulation signal, and wherein the comparator variably controls a bias current depending on the control voltage.

8. A control circuit for controlling a switching transistor of a switching regulator, comprising:

a hysteresis comparator circuit configured to compare a feedback voltage according to an output signal of the switching regulator with a threshold voltage, and configured to output a pulse width modulation signal as an output signal of the hysteresis comparator circuit, the threshold voltage having a hysteresis according to the pulse width modulation signal;

a driver, to which the pulse width modulation signal is input, configured to drive the switching transistor based on the pulse width modulation signal;

a phase comparator configured to generate a phase difference signal based on a phase difference between a reference clock signal and a pulse signal corresponding to the pulse width modulation signal; and a loop filter configured to generate a control voltage by filtering the phase difference signal, wherein the hysteresis comparator circuit is further configured to control a response speed thereof depending on the control voltage, wherein the hysteresis comparator circuit includes:

a comparator including a first input terminal to which the feedback voltage is input and a second input terminal to which the reference voltage is input; and one of a first feedback circuit and a second feedback circuit, wherein the first feedback circuit is configured to feed a first feedback pulse signal back to the second input terminal, and the first feedback pulse signal has a logic level opposite to a logic level of the pulse width modulation signal, wherein the second feedback circuit is configured to feed a second feedback pulse signal back to the first input terminal, and the second feedback pulse signal has the same logic level as the logic level of the pulse width modulation signal, wherein each of the first and the second feedback circuits variably controls a time constant depending on the control voltage.

9. The control circuit of claim 8, wherein each of the first and the second feedback circuits includes an inverter configured to invert the pulse width modulation signal, a resistor and a capacitor which are serially connected to one another, the inverter variably controlling a delay amount depending on the control voltage.

10. A control circuit for controlling a switching transistor of a switching regulator, comprising:

a hysteresis comparator circuit configured to compare a feedback voltage according to an output signal of the switching regulator with a threshold voltage, and configured to output a pulse width modulation signal, the threshold voltage having a hysteresis according to the pulse width modulation signal;

a driver, to which the pulse width modulation signal is input, configured to drive the switching transistor based on the pulse width modulation signal;

a monitor configured to monitor a phase difference between a reference clock signal and the pulse width modulation signal; and a controller configured to control a response speed of the hysteresis comparator circuit in accordance with phase difference monitored by the monitor, wherein the hysteresis comparator circuit includes:

a comparator including a first input terminal to which the feedback voltage is input and a second input terminal to which a reference voltage is input; and one of a first feedback circuit and a second feedback circuit, wherein the first feedback circuit is configured to feed a first feedback pulse signal back to the second input terminal, and the first feedback pulse signal has a logic level opposite to a logic level of the pulse width modulation signal, wherein the second feedback circuit is configured to feed a second feedback pulse signal back to the first input terminal, and the second feedback pulse signal has the same logic level as the logic level of the pulse width modulation signal, and wherein the comparator variably controls a bias current depending on the control voltage.

11. A control circuit for controlling a switching transistor of a switching regulator, comprising:

a hysteresis comparator circuit configured to compare a feedback voltage according to an output signal of the switching regulator with a threshold voltage, and configured to output a pulse width modulation signal, the threshold voltage having a hysteresis according to the pulse width modulation signal;

a driver, to which the pulse width modulation signal is input, configured to drive the switching transistor based on the pulse width modulation signal;

a monitor configured to monitor a phase difference between a reference clock signal and the pulse width modulation signal; and a controller configured to control the response speed of the hysteresis comparator circuit in accordance with phase difference monitored by the monitor, wherein the hysteresis comparator circuit includes:

a comparator including a first input terminal to which the feedback voltage is input and a second input terminal to which the reference voltage is input; and one of a first feedback circuit and a second feedback circuit, wherein the first feedback circuit is configured to feed a first feedback pulse signal back to the second input terminal, and the first feedback pulse signal has a logic level opposite to a logic level of the pulse width modulation signal, wherein the second feedback circuit is configured to feed a second feedback pulse signal back to the first input terminal, and the second feedback pulse signal has the same logic level as the logic level of the pulse width modulation signal, wherein each of the first and the second feedback circuits variably controls a time constant depending on the control voltage.

* * * * *